US010917357B2

(12) United States Patent
Papaure et al.

(10) Patent No.: US 10,917,357 B2
(45) Date of Patent: Feb. 9, 2021

(54) MESSAGE EXCHANGE DURING PARALLEL EXECUTION OF PROCESSES IN A HIGH-PERFORMANCE COMPUTER

(71) Applicant: BULL SAS, Les Clayes-sous-Bois (FR)

(72) Inventors: Guillaume Papaure, Grenoble (FR); Jean-Vincent Ficet, La Chapelle (FR); Jean-Olivier Gerphagnon, Vif (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 15/698,979

(22) Filed: Sep. 8, 2017

(65) Prior Publication Data

US 2018/0069803 A1 Mar. 8, 2018

(30) Foreign Application Priority Data

Sep. 8, 2016 (FR) ..................... 16 58347

(51) Int. Cl.
| | |
|---|---|
| *H04L 12/911* | (2013.01) |
| *H04L 29/12* | (2006.01) |
| *H04L 29/08* | (2006.01) |
| *G06F 9/54* | (2006.01) |
| *G06F 13/362* | (2006.01) |

(52) U.S. Cl.
CPC .......... *H04L 47/783* (2013.01); *G06F 9/546* (2013.01); *G06F 9/547* (2013.01); *G06F 13/362* (2013.01); *H04L 61/15* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,617,537 | A * | 4/1997 | Yamada ................. | G06F 15/17 709/201 |
| 7,010,607 | B1 * | 3/2006 | Bunton .................... | H04L 1/18 709/228 |
| 2003/0031183 | A1 | 2/2003 | Kashyap et al. | |
| 2003/0061382 | A1 | 3/2003 | Brown et al. | |
| 2009/0073978 | A1 * | 3/2009 | Craddock .............. | H04L 45/16 370/390 |

(Continued)

OTHER PUBLICATIONS

Search Report as issued in French Patent Application No. 1658347, dated May 10, 2017.

*Primary Examiner* — Davoud A Zand
(74) *Attorney, Agent, or Firm* — Pillsbury Winthrop Shaw Pittman LLP (57) ABSTRACT

Processes pending execution in respective compute nodes (N1-Nn) of a cluster of a distributed HPC computer can communicate with one another by message exchange through an interconnected fabric. To exchange messages between the processes a method is proposed to identify the physical cards associated with the compute nodes directly from the hostname of the compute nodes as they are used in the user program. This direct identification is made from at least one mapping table (MT1) associating bijectively the hostname of each compute node of the cluster with the unique logical address of the associated physical card. This mapping table is kept in a component of the computer responsible for managing the fabric, i.e. the fabric manager (FM1). Various implementations enable scaling when accomplishing the method of message exchange between processes.

9 Claims, 4 Drawing Sheets

(56) References Cited

U.S. PATENT DOCUMENTS

| | | | |
|---|---|---|---|
| 2009/0077268 A1* | 3/2009 | Craddock | H04L 12/1886 709/250 |
| 2011/0219208 A1* | 9/2011 | Asaad | G06F 9/06 712/12 |
| 2012/0151074 A1 | 6/2012 | Wood et al. | |
| 2013/0051393 A1 | 2/2013 | Gavrilov et al. | |
| 2014/0344391 A1* | 11/2014 | Varney | H04L 41/50 709/213 |
| 2014/0344401 A1* | 11/2014 | Varney | H04L 67/1097 709/217 |

* cited by examiner

MESSAGE EXCHANGE DURING PARALLEL EXECUTION OF PROCESSES IN A HIGH-PERFORMANCE COMPUTER

CROSS-REFERENCE TO RELATED APPLICATIONS

This application claims priority to French Patent Application No. 1658347, filed Sep. 8, 2016, the entire content of which is incorporated herein by reference in its entirety.

FIELD

The present invention relates in a general sense to high-performance computers, also known as HPC (High-Performance Computing) computers.

In relates in particular to the identification of a network card corresponding to a compute node used during execution of a task in an HPC computer of the distributed memory type, and concerns more specifically a method for message exchange during execution of processes performing parallel operations of a user program in the course of execution of a high-performance computer.

The invention finds applications, in particular, in high-performance computers which are used, for example, in the field of scientific or financial computation. The invention can also apply to environments of the Cloud Computing type, i.e. the elements of which are remote from one another, possibly in different sites.

TECHNOLOGICAL CONTEXT

A cluster of servers is a group of independent servers operating as a single data-processing system. A client uses a cluster as though it were a single machine. Clusters habitually consist of nodes, where a node includes at minimum one processor and memory. These nodes commonly include compute and/or storage nodes, and one or more service nodes such as frontal nodes which enable the cluster to be administered. In certain applications additional service nodes can also be dedicated to monitoring activity, for example. The cluster nodes can be connected to one another by one or more technologically similar or different networks.

A network with a relatively slow transmission rate, firstly, is thus generally dedicated to administration tasks (loading of systems into the nodes, activity monitoring, load measurement, etc.). In this administration network each node is identified in a unique manner, for example an IP (Internet Protocol) address for an administration network of the Ethernet type to which a name also corresponds.

This name of the machine associated with the compute node, or machine-name, or alternatively hostname, is a mapping enabling a machine to be identified in the interconnected network. This hostname can be used in the code of a program containing instructions or routines which use the corresponding machine. In the context of HPC such a machine is typically a compute node of the cluster. This pseudonym of the machine is associated bijectively with its identifier in the administration network, for example its IP address.

A second network or interconnected network (or interconnected fabric) with a much higher transmission rate and low latency is firstly added to this administration network. This network can also use technologies of the InfiniBand™ or Intel OmniPath™ type. The unit transmission rate may be as high as several tens of gigabits per second, for example.

In a model of parallel programming by message exchange the program to be executed is duplicated in several processes. Each process executes one copy of the program in a respective compute node of the cluster, and has access to its own memory in this node in the case of a distributed-memory computer. The variables of the program consequently become local variables in each process. In addition, a process cannot access the memory of neighbouring processes. A process (transmitter process) can however send data to other processes (receiver processes). To this end the receiver processes should have been informed that they were to receive this information from the transmitter process. Communication between the processes is accomplished by message exchange, i.e. by transmission/receipt of messages between processes.

To this end programs executed in this type of machine can use a standard API, such as, for example, MPI (Message Passing Interface), which uses communication with messages exchanged between various processes distributed across the nodes. Technically, this communication is accomplished via functions of the MPI library called in the program. The MPI environment enables these messages to be managed and interpreted.

In such a context the number of communicating elements (processes) can be very high, for example several thousand. And this number is constantly increasing, particularly as we enter the exaflopic era.

BACKGROUND

When a task is submitted to a distributed computer of the above-mentioned type a given number of resources is specified by the user. In general it is expressed as a number of nodes or as a number of processor cores which are required to execute the task.

As a consequence, when allocating the resources the task will be executed in a defined number of nodes, each identified by their hostname. These names are in fact aliases enabling the IP address corresponding to each node to be determined. This determination, or translation, is generally accomplished through a service of the DNS type (Domain Name Service) or through a local mapping file (/etc/hosts).

It is then needed to identify the associated physical cards (or network cards) of the high bandwidth network (InfiniBand™ or IB, OmniPath™ or OPA, etc.) which will be used during the communications (message exchanges), when executing the task. It is therefore needed to determine the unique identifier, in the interconnected network, of each physical card of each node used to perform the submitted task. This unique node identifier in the interconnected network is called the Node ID.

To summarise, there are three levels of identification of a resource used to execute a task corresponding to a part of the computation:
 the Hostname, which is its pseudonym used in the executed program,
 the IP address, which is its identifier in the administration network, and
 the Node ID, which is the identifier in the interconnected network of the corresponding network card.

And both the following translation steps, noted ① and ② respectively, are performed to reach the desired physical element in the exchanges during execution of the task:
 Hostname-①→IP address-②→Node ID (IB, OPA, etc.)
 This identification method is standard in MPI and in all supercomputers.

However, it is far from optimal, since it requires several stages, each one of which may cause different problems:
- Problem of scalability, particularly since the DNS server is unique, and may not have the load-handling ability to undertake a large number of ① translations;
- Problem of consistency of the data required for both the ① and ② translations, since it is possible that the/etc/hosts files may not be up-to-date in certain nodes;
- Very large number of translation operations, each requiring computation time, which is therefore lost for the computation itself (initialisation time);
- Need to ask each node for its Node ID when the IP resolution has been obtained, leading to a large number of exchanges over the interconnected network for the ② translations.

SUMMARY

An aspect of the invention seeks to enable the Node IDs of the high bandwidth network cards (IB, OPA, etc.) corresponding to the nodes used during a computation executed by using parallelisation of processes on a distributed-memory supercomputer to be obtained more rapidly and more efficiently, from the name of a node (hostname) as used in the application program. In particular, one of the efficiency constraints taken into account is to be able to scale up in the case of clusters with a very large number of nodes (for example several tens of thousands).

To this end, implementations of the invention propose to obtain directly, through one or more third-party entities, the Node ID of a compute node used during the computation from its hostname. The invention therefore enables all or a proportion of the disadvantages of the above-mentioned prior art to be eliminated, or at least attenuated, since it avoids the two translations ① and ② explained in the introduction.

Depending on implementations of the invention, processes pending execution on respective compute nodes may communicate with one another by message exchange through the interconnection fabric. For message exchange between processes the identification of a physical card (HCA) associated with a compute node is accomplished directly from the hostname of the said node which is used in the user program. This direct identification is made from at least one mapping table associating bijectively the name of each compute node of the cluster with the unique logical address of the associated physical card. This mapping table is kept in a logical component of the computer responsible for managing the fabric, namely the fabric manager. This table, which exists already within a service server which operates as the cluster's head node, associates bijectively the identifiers of each physical card present in the nodes of the cluster with the host names of the corresponding nodes as they appear logically in the user program.

More specifically, a first aspect of the invention proposes a method of message exchange during execution of processes performing parallel operations of a user program in the course of execution in a distributed high-performance computer comprising, firstly, a cluster of compute nodes within which each compute node is known in the user program by a host name (or pseudonym, or alias), and is associated with a physical card with determined physical resources (e.g. processor cores, storage memory) for execution of a process, and with a unique logical address (Node ID identifier) and, secondly, an interconnected fabric (e.g. one with a high bandwidth and low latency) interconnecting the compute nodes. For message exchange between processes able to communicate with one another by message exchange through the interconnected fabric, the identification of a physical card associated with a compute node directly on the basis of the hostname of the said compute node used in the user program, from at least one mapping table associating bijectively the hostname of each compute node of the cluster with the unique logical address of the associated physical card, where the said mapping table is kept in a computer component responsible for managing the interconnected fabric.

In implementations the cluster of compute nodes may be organised as a plurality of sub-clusters of compute nodes associated respectively with a plurality of fabric managers, each of which is dedicated to one of the sub-clusters, and each of which contains a mapping table associating bijectively the hostname of each compute node of the cluster (i.e., of all the sub-clusters) with the unique logical address of the associated physical card.

In this case the plurality of fabric managers may also be organised as an architecture of master/slave servers, with a master server containing the mapping table and slave servers containing a replication of this mapping table, where the said master server is configured to ensure consistency of the said mapping tables, and to synchronise itself with all the slave servers.

As a variant, all or a proportion of the data of the mapping table may be extracted in real time from the fabric manager, and may be replicated in a database distributed over a plurality of intermediate service servers, where the identification of the physical card associated with each compute node used during execution of the task is accomplished directly from the hostname of the said node through one of the replicas of the fabric manager's mapping table stored respectively in the said intermediate service servers.

In this variant the plurality of intermediate service servers may be organised as a master/slave architecture with a master intermediate service server configured to ensure data consistency, and to synchronise itself with all the slave intermediate service servers.

In yet another variant, the relationship between the name of all the compute nodes to be used to execute the task, firstly, and the unique logical addresses of the physical cards which are associated respectively with them, secondly, may be created only once, before the task is executed, and may be stored in a cache memory for re-use during execution of the task.

In example implementations of the method, message exchange between processes may be accomplished by using the MPI library, or any other library or process operating using the same principle as MPI.

In a second aspect, the invention also relates to a non-transitory computer program product (e.g. a non-transitory machine readable medium, e.g. a memory) comprising a set of instructions which, when executed by a physical processor, is able to implement the method according to the first above aspect for the message exchange between processes accomplishing parallel operations of the program within a high-performance computer.

A third aspect of the invention relates to a distributed high-performance computer comprising a cluster of compute nodes with physical resources such that each one executes a process of a task independently from the other processes executed in parallel by other compute nodes of the computer, and a system configured to manage the message exchange between the said processes using the method according to the above first aspect.

The computer program and the high-performance computer have at least the same benefits as those procured by the method according to the first aspect of the invention.

BRIEF DESCRIPTION OF THE ILLUSTRATIONS

Other characteristics and benefits of the invention will be seen on reading the description below. This description is purely illustrative, and must be read with reference to the appended illustrations, in which.

DETAILED DESCRIPTION

In the description of implementations below, and in the Figures of the appended illustrations, the same elements or similar elements have the same numeric references to the illustrations.

High-performance computing (HPC) refers to a branch of applied information technology, essentially relating to the resolution of problems requiring a high computation capacity. Many problems in principle demanding very powerful machines may be broken down and resolved by undertaking computations in parallel. The complex tasks may, indeed, take advantage of parallelism between several smaller machines (or compute nodes), which are grouped into systems called computation clusters. Computation clusters allow the power of several machines to accomplish demanding computations. A computation cluster is a set of uniform, localised physical machines which is used according to the principle of parallel programming. Typically, the compute nodes are contained in servers or IT bays.

This type of computer is used, for example, in scientific research centres (meteorology, nuclear simulation, etc.). The benefit of using parallel programming is, in particular, to reduce the restitution time, to undertake larger computations, to exploit the parallelism of modern processors (multi-core, multithreading), etc.

Task-based parallelism refers to the case in which it is the tasks to be accomplished which are parallelised, rather than the input data or settings. Parallelism occurs when different processes are accomplished simultaneously on the data. There are two types of implementation whereby a task can be parallelised: by using several execution threads, or by using several processes executed in parallel.

In implementations of the first type, the execution threads are able to access a common live memory space, or shared memory. They can thus operate on the same data. This has the benefit that it is not necessary to copy memory between two computational units, and in practice this eliminates communication between the computation units. Conversely, execution threads are also limited to being executed in a single compute node. The gain obtained by this technique of parallelism is thus limited by the number of execution threads, which will typically be equal to or less than the number of computation cores available in the node. Thus, for example, OpenMP is a multithreading overlay, in the sense that it enables loops to be parallelised very simply using pragmas added to the source code. OpenMP is clearly oriented towards shared-memory programming (i.e. the memory must be accessible to the various execution threads of the program compiled with OpenMP), which limits the program to an isolated machine.

Parallelisation of processes according to implementations of the second above-mentioned type, conversely, enables a much larger quantity of resources to be used. The various processes can, indeed, be executed both in the same compute node and in different nodes, and the memory is distributed over the different nodes. Unlike with execution threads, processes do not therefore share any memory space. The benefit of this that it is easier to guarantee the integrity of the memory data. A process cannot indeed, even by accident, modify the memory space of another process. But this benefit comes at a cost, since it becomes necessary to undertake explicit communication operations to copy data between two processes. In order to work with several processes in parallel on the same data processes must be coordinated. To accomplish this the message passing interface MPI library is usually used.

MPI is a library enabling processes to be coordinated by using the message exchange paradigm. Indeed, MPI allows two processes to communicate with one another, however they may be interconnected (for example by Ethernet or InfiniBand™ (IB) network, or alternatively OmniPath™ (OPA) network, or by shared memory within a given node, if applicable). It is one of the most used communication libraries in an HPC environment. This library enables programs to be created which execute parallel operations in the respective nodes of the cluster, and which can communicate through the interconnected network.

In a model of parallel programming by message exchange such as MPI the user program is duplicated in several processes. Each process executes one copy of the user program, and has access to its own memory. The variables of the program consequently become local variables in each process. In addition, a process cannot access the memory of neighbouring processes. It can, however, send data to other processes, provided the latter (receiver processes) are aware that they are to receive this data from the transmitter process. Communication between processes is accomplished only by message exchange between processes, i.e. by transmission and receipt of messages. Technically, this communication is accomplished via functions of the MPI library called in the user program. The MPI environment enables these messages to be managed and interpreted.

The physical resources of the cluster (processors, cores, memories) which execute the processes performing parallel operations of a given task communicate within a node, and also from one node to another. To this end the nodes are connected by an ultra-fast interconnected network, with a low latency time, so that they can exchange messages in order to coordinate the processing of the pending task. At minimum, each compute node and the head node must therefore be connected over the interconnected network. The name given as standard in the state of the art to designate this interconnected network is "fabric". The fabric of an HPC computer is therefore a fast physical network, for example InfiniBand™, OmniPath™, etc., enabling all the compute nodes in the cluster to be connected to one another.

Interconnected systems with a large number of compute nodes working together to resolve complex problems should also be administered. Suitable processes and tools to activate, inspect, manage and of hundreds or thousands of nodes thus enable a stable and consistent environment to be guaranteed. Thus, for example, and unlike OpenMP, OpenMPI can be used for the administration of distributed-memory infrastructures. OpenMPI creates a communication infrastructure on top of the physical interconnected network, which abstracts this physical network for the programmer. It is then possible to speak of network administration of the compute node cluster. This administration network can then deploy MPI processes almost everywhere over the infrastructure, without being concerned with the placing or management of the connections between the different machines in its infrastructure.

To perform a given task a scheduler is executed which enables the assignments of tasks of the various processes between the required nodes to be coordinated. The scheduler is executed, for example, in one of the cluster's head nodes. It identifies the available resources, attributes and distributes the tasks, and monitors the overall state of the nodes. It is the coordinator of the resources within the cluster. Users and administrators submit to this head node the tasks to be performed by the system or cluster.

Figure 1:
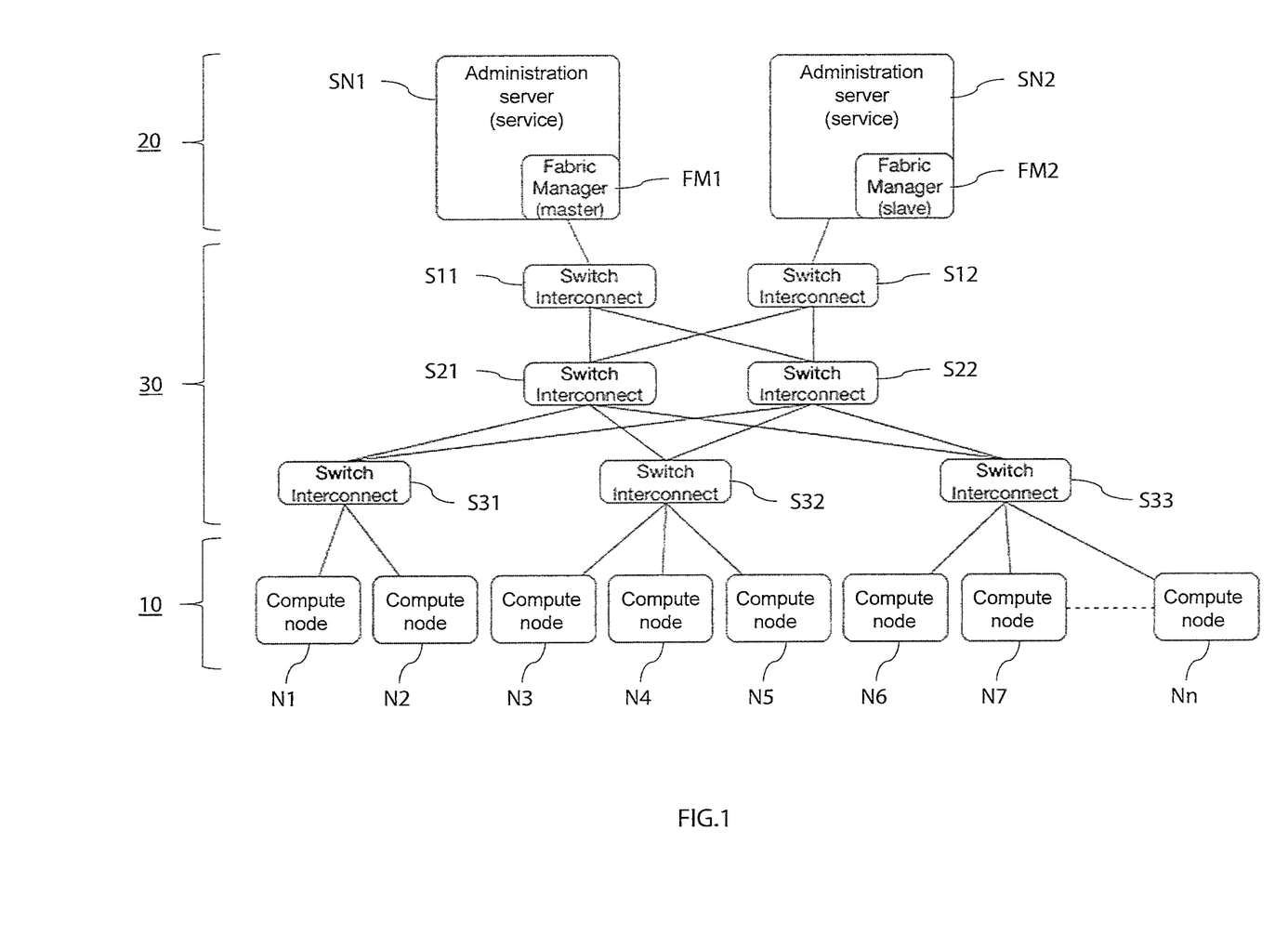
FIG. 1 is a simplified diagram of a distributed-memory high-performance computer, showing the main functional elements of the computer according to the implementations of the invention.

With reference to the diagram in FIG. 1, an HPC computer architecture of the cluster type includes in particular a cluster 10 of compute nodes (i.e. the cluster of compute nodes), an administration system 20 and an interconnected fabric 20.

Cluster 10 as represented in FIG. 1 includes a number n of compute nodes, respectively N1, N2, . . . , Nn. In practice number n of nodes may be very high, for example several hundreds or thousands. The present invention is not limited by the number of compute nodes.

The compute nodes are implemented, physically, in the form of physical machines or servers (including hardware components) connected to one another over interconnected fabric 20. These servers each host one or more physical cards (or HCA), which correspond to the physical resources of the distributed HPC computer. Each server contains, on these HCA cards, computation resources (e.g. one or more microprocessors) and memory resources (e.g., one or more physical memories). As known to those skilled in the art, HCA cards provide a connection between a port of managed system and other units. This port can be connected to another HCA card, to a target unit or to a switch which redirects the data from one of its ports to a unit connected to another of its ports.

The computation resources of a computation node include one or more processors, each with one or more cores.

Each of the nodes thus forms an independent computation entity, with at minimum one processor core and its own associated memory. It can thus execute, completely independently, a determined process of a task which the computer executes in the form of a plurality of processes executed in parallel, with memory specific to each process.

In other words, each process has its own data and has no direct access to the data of the other processes. The data of the program is stored in the memory of the processor on which the process is being executed. A data element is exchanged between two or more processes via a call to particular, specialist routines in the MPI library.

Administration system 20 of the computer includes one or more administration servers (e.g., including hardware components, one or more microprocessors, one or more memories . . . ), also called service nodes. An administration server is responsible, in particular, for authenticating the users, for starting the computation tasks, for file access, and also for supervising the entire computer.

When there are several such servers the administration servers use, for example, an organisation of the master/slave type. There are, for example, two such servers SN1 and SN2 in the HPC computer as represented in FIG. 1. Server SN1, also called the head node, is the master server, and server SN2 is a slave server. This number is only a non-restrictive example. A single administration server, or conversely more than two administration servers, are other conceivable examples.

Interconnected fabric 30 includes, in particular, a set of physical network switches, cables forming the interconnected links between the servers, and the associated application.

This associated application includes, in particular, a network component known to those skilled in the art by the name of fabric manager. This fabric manager may also be called a subnet manager, etc., depending on the technology of the computer in question. This fabric manager is a software component which is able to maintain a mapping table associating bijectively the name of each compute node in cluster 10 with the unique logical address of the associated physical card. In an implementation, the software component can be implemented via a set of machine executable instructions embedded in a non-transitory machine readable medium (e.g., a physical memory).

This is the reason why, according to the implementations of the present invention, the fabric manager plays the role of a third-party entity to which requests are made, in the course of execution of a program, to obtain, from the hostname of a compute node of the cluster in which a determined process is being executed, the unique logical address of the physical card associated with this node. This use is original and beneficial in the context of the message exchange between processes using the MPI library, for example. This will be described in detail below with reference to the diagram of FIG. 2.

In the example represented in FIG. 1 the fabric has a three-stage hierarchical topology, for example of the fat tree type: a first stage with two switches S11 and S2 served by administration server SN1 and administration server SN2, respectively; and then a second level with two other switches S21 and S22 interleaved with the first-level switches; and finally a third and final level, with three other switches S31, S32 and S33 interleaved with the second-level switches. This example is purely illustrative, and in no sense restrictive of the invention's implementations.

Figure 2:
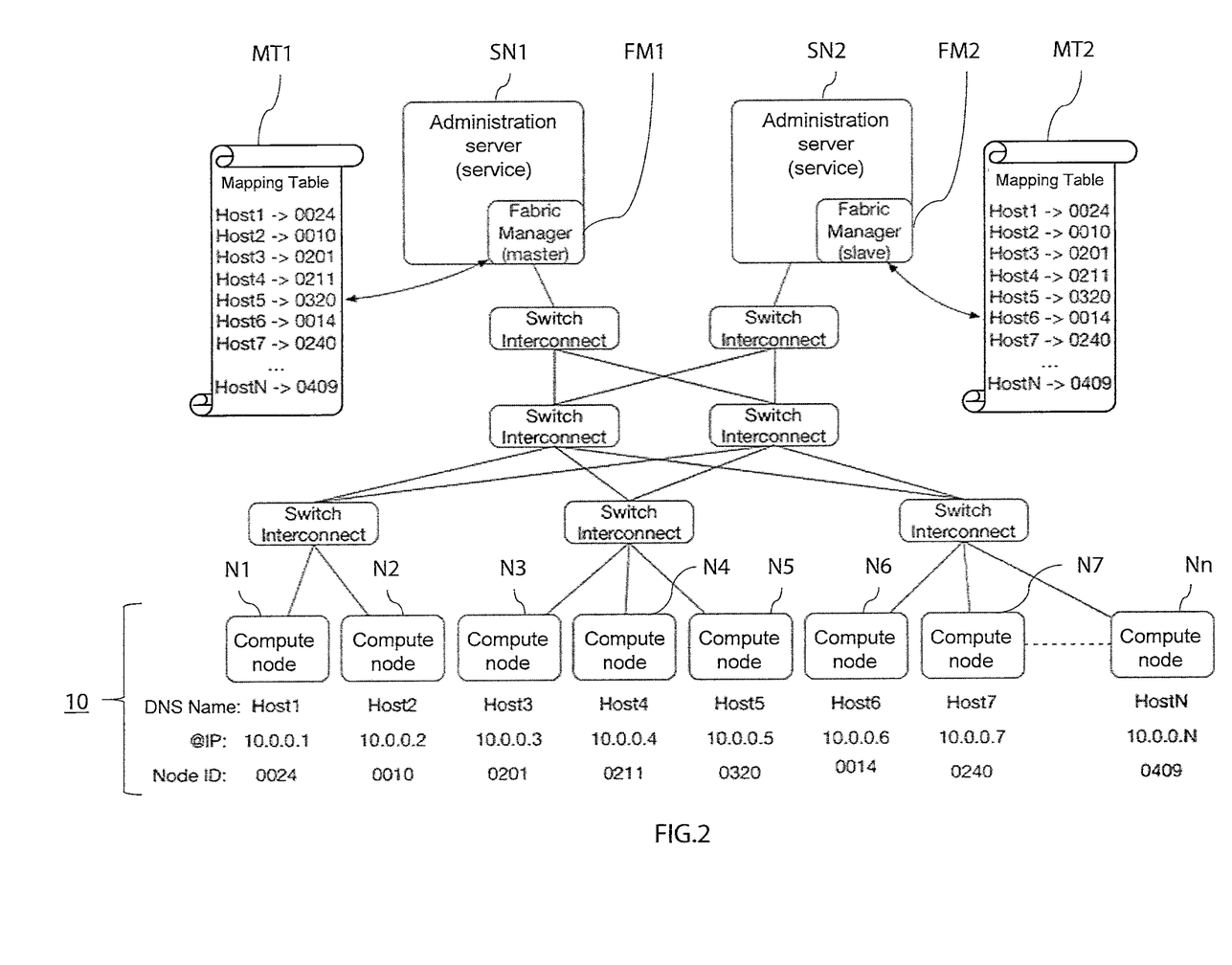
FIG. 2 shows the logical identifiers (hostname, IP address, node ID) of the compute nodes of the diagram of FIG. 1.

The diagram of FIG. 2 corresponds to that of FIG. 1 in which, for cluster 10, the logical identification elements of the different compute nodes have been added, at the bottom of the Figure. These logical identification elements include, for each compute node N1 to Nn:

the hostname which is the pseudonym of the compute node used in the user program pending execution; in the represented example Host1 is the hostname of node N1, Host2 is the hostname of node N2, etc., and HostN is the hostname of node Nn;

the IP address (or "@IP") which is the identifier in the administration network; in the represented example 10.0.0.1 is the IP address of node N1, 10.0.0.2 is the IP address of node N2, etc., and 10.0.0.N is the IP address of node Nn; and, the Node ID which is the identifier of the compute node in the interconnected network (i.e. the fabric) of the corresponding network card; in the represented example this identifier is encoded by a four-figure number, for example 0024 for node N1, 0010 for node N2, 0201 for node N2, 0211 for node N4, etc. These are, of course, arbitrary examples which do not restrict the invention.

FIG. 2 also shows that fabric manager FM1 maintains a mapping table MT1 which associates bijectively the hostname of each compute node of cluster 10 with unique logical address Node ID of the associated physical card. This table MT1 is managed by master fabric manager FM1. When there is/are one (or more) slave fabric manager(s) such as manager FM2 in the example of FIG. 2, table MT1 is replicated in the corresponding service node, namely server SN2 in FIG. 2, as table MT2.

Implementations of the invention include, for inter-process MPI message exchange, the identification of a physical card (HCA card), associated with a compute node used during execution of the task, directly from the hostname of the said node as it is used in the user program. This direct identification is accomplished through at least one third-party logical entity containing all or part of the above-mentioned mapping table. In the implementation of FIG. 2 this third-party entity is fabric manager FM1, in cooperation with the slave fabric manager(s) such as FM1, if applicable.

Those skilled in the art will appreciate that the fabric manager is a software component responsible for managing the identifiers of each physical card (HCA) present in the nodes of the cluster. Mapping table MT1 therefore already exists in a computer of the prior art. However, it is not used, in the prior art, when initialising the message exchange between processes for a library such as MPI.

But its use in accordance with implementations of the invention enables the disadvantages to be avoided which arise from the two translations ① and ② according to the prior art, which were presented in the introduction.

Figure 3:
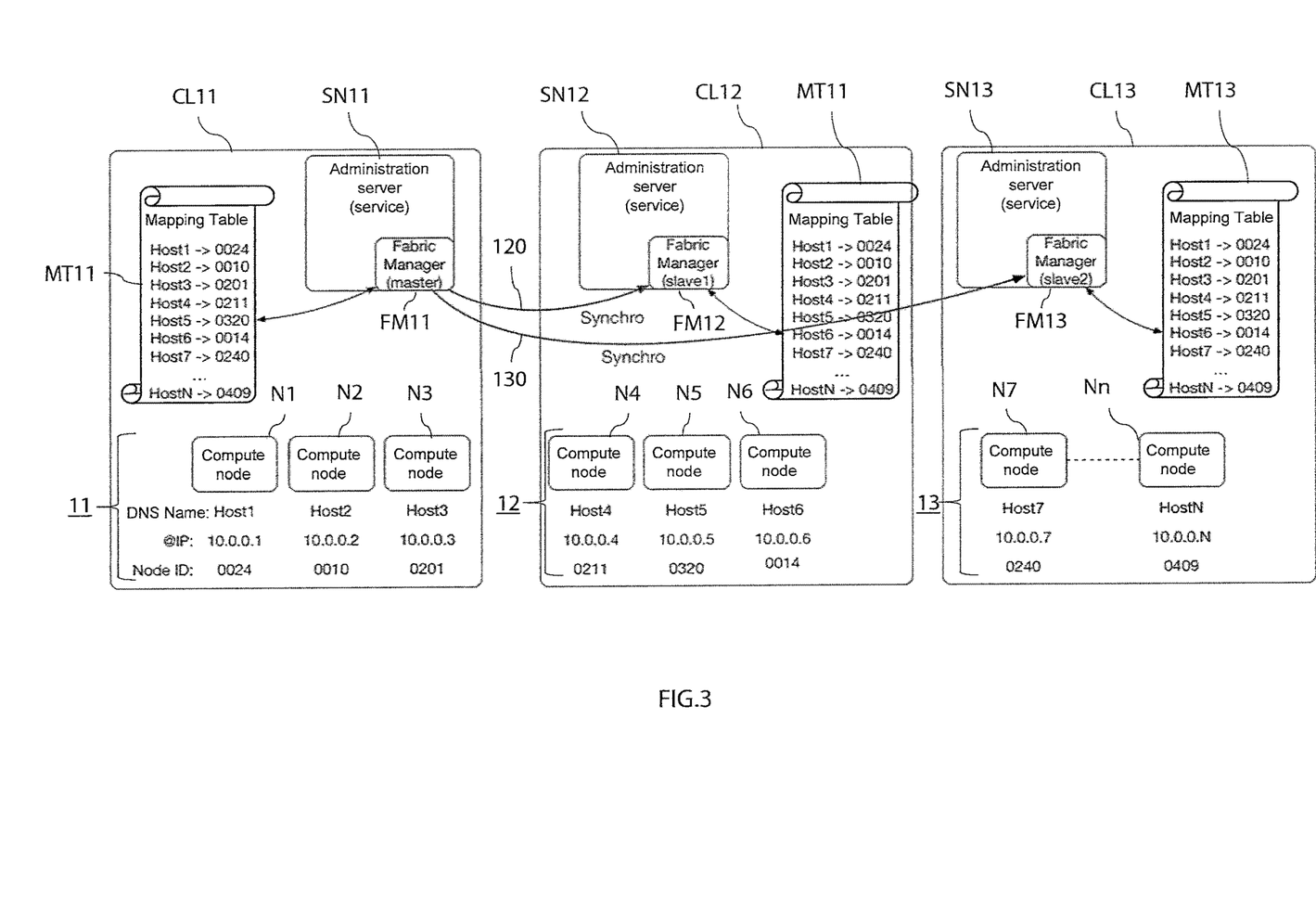
FIG. 3 is a functional diagram of an HPC computer according to a first implementation.

In the implementation of FIG. 3 the cluster of compute nodes is organised as a plurality of sub-clusters of compute nodes 11, 12 and 13. In the represented example, nodes N1, N2 and N3 thus belong to sub-cluster 11, nodes N4, N5 and N6 belong to sub-cluster 12, and nodes N7 to Nn thus belong to sub-cluster 13. It will be appreciated that the invention is not restricted by the number of sub-clusters, nor by the distribution of compute nodes of the cluster within these sub-clusters.

Each of sub-clusters 11, 12 and 13 shown in FIG. 3 is associated with a dedicated fabric manager, FM11, FM12 and FM13 respectively. Each of the fabric managers contains a mapping table MT11, MT12 and MT13, respectively, which are comparable with mapping table MT1 of FIG. 2. These tables MT11, MT12 and MT13 associate bijectively the hostname of each compute node of cluster 10 with unique logical address Node ID of the associated physical card.

The plurality of fabric managers FM 11, FM 12 and FM 13 can be organised within a service servers architecture of the master/slave type with, for example, a master server SN11 containing fabric manager FM11, and slave servers SN12 and SN13 containing fabric managers FM 12 and FM13, respectively. Master sub-fabric manager FM 11 is configured to ensure data consistency, and to synchronise all slave sub-fabric managers FM 12 and FM13. This is illustrated in FIG. 3 by arrows 120 and 130, respectively.

Putting it another way, in this implementation cluster of compute nodes 10 of FIG. 2 is divided into sub-portions 11, 12 and 13 with a fabric manager FM11, FM12 and FM13, respectively, dedicated to each sub-portion, and these managers are synchronised with one another. Each group of nodes thus communicates with a fabric manager dedicated to it. By this means scaling is facilitated in the case of computers with a large number of compute nodes.

Figure 4:
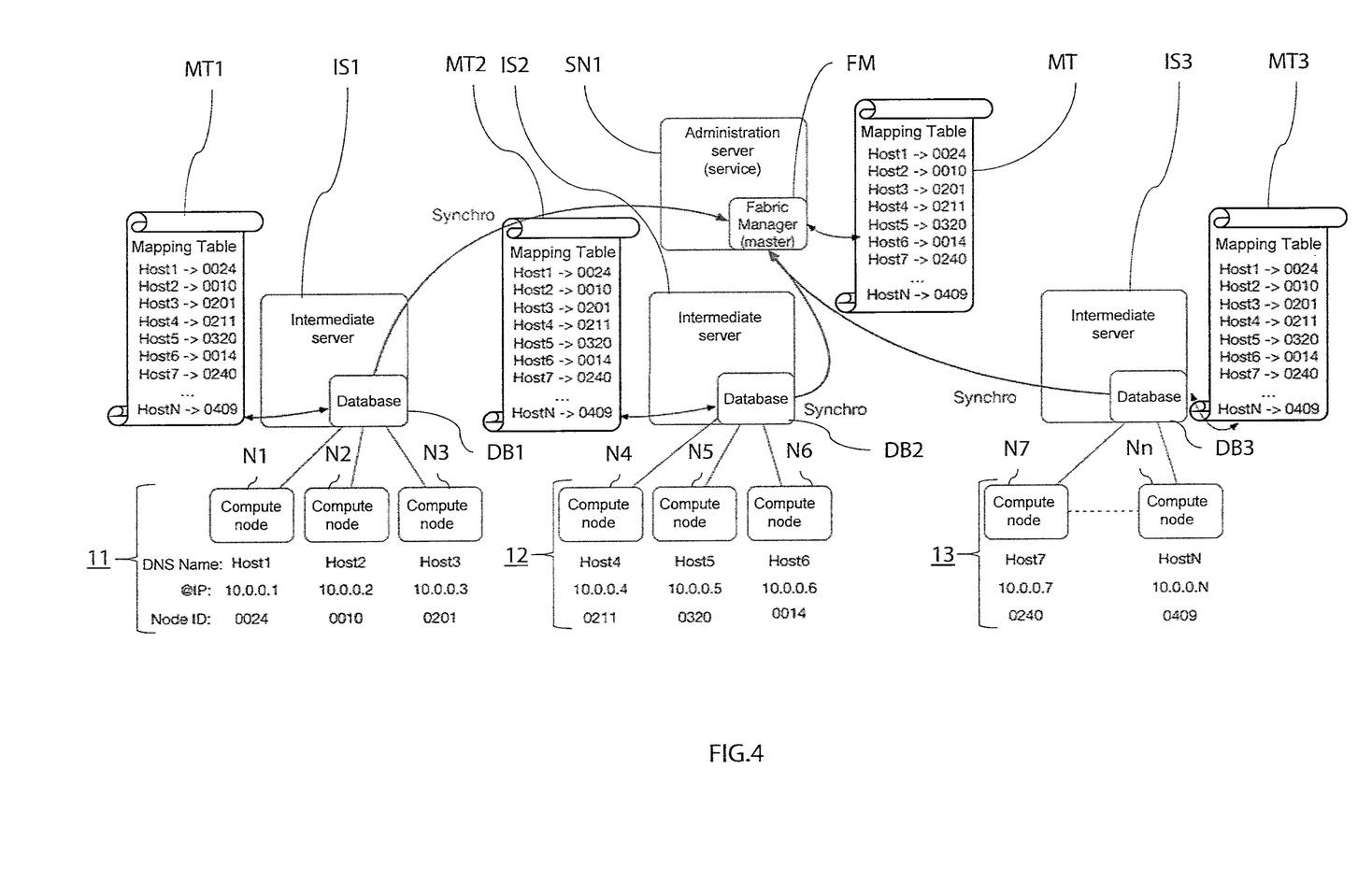
FIG. 4 is a functional diagram of an HPC computer according to a second implementation.

Another embodiment will now be presented with reference to the diagram of FIG. 4, which enables scaling to be accomplished in another manner. In this implementation all or a proportion of the data of mapping table MT is extracted in real time from fabric manager FM and is replicated in a database which is distributed over a plurality of intermediate service servers IS1, IS2, and IS3, in order to prevent formation of a bottleneck for the message exchanges in clusters with large numbers of compute nodes.

In this implementation the identification of the physical card associated with each compute node used during execution of the task is accomplished, for the message exchange, directly from the hostname of the said node through one of replicas MT1, MT2 and MT3 of the mapping table of the fabric manager, each of which is stored in one of intermediate service servers IS1, IS2, and IS3, respectively.

In the example represented in FIG. 4 intermediate server IS1 serves a first group 11 of the nodes of cluster 10 including nodes N1, N2 and N3, intermediate server 152 serves a second group 12 of nodes of cluster 10 including nodes N4, N5 and N6, and intermediate server IS3 serves a third group 13 of the nodes of cluster 10 including nodes N7 to Nn. The intermediate service servers thus share the burden of identification of the physical cards of the compute nodes where the messages are to be sent, depending on the node transmitting the messages. Scaling is thus easily accomplished in the case of HPC computers with a cluster including a large number of compute nodes.

In one implementation the plurality of intermediate service servers IS1, IS2, and IS3 can be organised as a master/slave architecture. Master intermediate service server IS1 can be configured to ensure data consistency of the translations table, and to synchronise itself with all the slave intermediate service servers, namely IS2 and IS3 in the represented example.

The present invention has been described and illustrated in the present detailed description and in the Figures. The present invention is not restricted to the presented forms of implementation. Other variants and implementations may be deduced and implemented by those skilled in the art on reading the present description and the appended Figures.

For example, in other implementations, the bijective relationship between the hostname of all the compute nodes to be used to execute the task, firstly, and the unique logical addresses of the physical cards which are associated respectively with them, secondly, may be created only once, before the task is executed, and may be stored in a cache memory for re-use during execution of the task.

In the claims the term "includes" does not exclude other elements or other steps. The indefinite article "one" does not exclude the plural. A single processor or several other units may be used to implement the invention. The various presented and/or claimed characteristics may be combined advantageously. Their presence in the description or in different dependent claims does not exclude this possibility. The reference signs cannot be understood as limiting the scope of the invention.

The invention claimed is:

1. A method of message exchange during execution of processes performing parallel operations of a user program in the course of execution in a distributed high-performance computer comprising, firstly, a cluster of compute nodes within which each compute node is known in the user program by a host name or pseudonym, or alias, and is associated with a physical card (HCA) with determined physical resources for execution of a process, and with a unique logical address (Node ID identifier) and, secondly, an interconnected fabric with a high bandwidth and low latency interconnecting the compute nodes, wherein each compute node is associated with an IP address in the interconnected fabric, the method comprising:

carrying out the message exchange between processes able to communicate with one another by message exchange through the interconnected fabric and performing said parallel operations, wherein to carry out said message exchange between the processes, the method includes identifying the physical card (HCA) associated with a compute node directly on a basis of the hostname of the compute node used in the user program, from at least one bijective mapping table associating bijectively the hostname of each compute node of the cluster with the unique logical address of the associated physical card such that the identifying is carried out without using the IP address of the computer node, wherein the mapping table is kept in a component of the computer responsible for managing the interconnected fabric.

2. The method according to claim 1, wherein the cluster of compute nodes is organised as a plurality of sub-clusters of compute nodes associated respectively with a plurality of fabric managers, each of which is dedicated to one of the sub-clusters, and each of which contains a mapping table associating bijectively the hostname of each compute node of the cluster with the unique logical address of the associated physical card.

3. The method according to claim 2, wherein the plurality of fabric managers is organised as a master/slave server architecture, with a master server containing a first mapping table, and slave servers containing the other mapping tables, wherein the master server is configured to ensure consistency of the mapping tables, and to synchronise itself with all the slave servers.

4. The method according to claim 1, wherein the relationship between the name of all the compute nodes to be used to execute the task, firstly, and the unique logical addresses of the physical cards which are associated respectively with them, secondly, is created only once, before the task is executed, and is stored in a cache memory for re-use during execution of the task.

5. The method according to claim 1, wherein the message exchange between processes is undertaken using the Message Passing Interface (MPI) library.

6. A method of message exchange during execution of processes performing parallel operations of a user program in the course of execution in a distributed high-performance computer comprising, firstly, a cluster of compute nodes within which each compute node is known in the user program by a host name or pseudonym, or alias, and is associated with a physical card (HCA) with determined physical resources for execution of a process, and with a unique logical address (Node ID identifier) and, secondly, an interconnected fabric with a high bandwidth and low latency interconnecting the compute nodes, wherein each compute node is associated with an IP address in the interconnected fabric, the method comprising:

for the message exchange between processes able to communicate with one another by message exchange through the interconnected fabric and performing said parallel operations, identifying the physical card (HCA) associated with a compute node directly on a basis of the hostname of the compute node used in the user program, from at least one mapping table associating bijectively the hostname of each compute node of the cluster with the unique logical address of the associated physical card, wherein the mapping table is kept in a component of the computer responsible for managing the interconnected fabric, wherein all or a proportion of the data of the mapping table is extracted in real time from the fabric manager, and is replicated in a database distributed over a plurality of intermediate service servers, wherein the identification of the physical card associated with each compute node used during execution of the task is accomplished directly from the hostname of the node through one of the replicas of the fabric manager's mapping table stored respectively in said intermediate service servers.

7. The method according to claim 6, wherein the plurality of intermediate service servers is organised as a master/slave architecture with a master intermediate service server configured to ensure data consistency, and to synchronise itself with all the slave intermediate service servers.

8. A non-transitory computer program product comprising a set of instructions which, when executed by a processor, is able to implement a method of message exchange during execution of processes performing parallel operations of a user program in the course of execution in a distributed high-performance computer comprising, firstly, a cluster of compute nodes within which each compute node is known in the user program by a host name or pseudonym, or alias, and is associated with a physical card (HCA) with determined physical resources for execution of a process, and with a unique logical address (Node ID identifier) and, secondly, an interconnected fabric with a high bandwidth and low latency interconnecting the compute nodes, wherein each compute node is associated with an IP address in the interconnected fabric, the method comprising:

carrying out the message exchange between processes able to communicate with one another by message exchange through the interconnected fabric and performing said parallel operations, wherein to carry out said message exchange between the processes, the method includes identifying the physical card (HCA) associated with a compute node directly on a basis of the hostname of the compute node used in the user program, from at least one bijective mapping table associating bijectively the hostname of each compute node of the cluster with the unique logical address of the associated physical card such that the identifying is carried out without using the IP address of the computer node, wherein the mapping table is kept in a component of the computer responsible for managing the interconnected fabric.

9. A distributed high-performance computer comprising a cluster of compute nodes with physical resources such that each one executes a process of a task independently from the other processes executed in parallel by other compute nodes of the computer, and a system configured to manage the message exchange between the processes, said system including a non-transitory computer program product comprising a set of instructions which, when executed by a processor, is able to implement a method of message exchange during execution of processes performing parallel operations of a user program in the course of execution in the distributed high-performance computer comprising, firstly, said cluster of compute nodes within which each compute node is known in the user program by a host name or pseudonym, or alias, and is associated with a physical card (HCA) with determined physical resources for execution of a process, and with a unique logical address (Node ID identifier) and, secondly, an interconnected fabric with a high bandwidth and low latency interconnecting the compute nodes, wherein each compute node is associated with an IP address in the interconnected fabric, the method comprising:

carrying out the message exchange between processes able to communicate with one another by message exchange through the interconnected fabric and performing said parallel operations, wherein to carry out said message exchange between the processes, the method includes identifying the physical card (HCA) associated with a compute node directly on a basis of the hostname of the compute node used in the user program, from at least one bijective mapping table associating bijectively the hostname of each compute node of the cluster with the unique logical address of the associated physical card such that the identifying is carried out without using the IP address of the computer node, wherein the mapping table is kept in a component of the computer responsible for managing the interconnected fabric.

* * * * *